Aug. 23, 1966 A. O. KORN, JR 3,267,738

ENVIRONMENTAL EXPOSURE DEVICE

Filed Jan. 13, 1964 3 Sheets-Sheet 1

INVENTOR.
ARTHUR O. KORN JR.
BY
Wade Koontz
Ruth Codier
ATTORNEYS

ENVIRONMENTAL EXPOSURE DEVICE

Filed Jan. 13, 1964 3 Sheets-Sheet 2

INVENTOR.
ARTHUR O. KORN, JR.

BY Wade Koontz
Pettis Codier
ATTORNEYS

INVENTOR.
ARTHUR O. KORN JR.
BY Wade Koontz and Ruth Coder
ATTORNEYS

United States Patent Office 3,267,738 Patented August 23, 1966

3,267,738
ENVIRONMENTAL EXPOSURE DEVICE

Arthur O. Korn, Jr., Nashua, N.H., assignor to the United States of America as represented by the Secretary of the Air Force Filed Jan. 13, 1964, Ser. No. 337,507
6 Claims. (Cl. 73—432)

The invention described herein may be manufactured and used by or for the United States Government for governmental purposes without payment to me of any royalty thereon.

The present invention relates to an airborne environmental exposure device and, more particularly, to the development of means for providing exposure of test specimens of balloon and other films and materials at given altitudes to determine the effects of conditions present at these altitudes on the specimens under test, such as ozone, infrared and ultraviolet rays, solar radiation and variation in temperatures and pressures.

Present day high altitude and space flight has made necessary an increased knowledge of the effects of high altitude conditions on many kinds of materials. The present invention was developed during research on the reaction of baloon films to high altitude conditions and the effects of ozone, infrared, ultraviolet, solar radiation and variation in temperature and pressures on materials under test. The specific tests carried out were balloon borne. Specifically in the balloon field, as payloads and floating altitudes increase, there is a continuing need for the development of new balloon films.

It is to be understood, however, that the invention is not limited to this field. The invention includes the testing of materials other than balloon films, and also that these materials may be borne aloft by other types of air or space craft.

The object of the invention is therefore the provision of a device which makes possible the exposure of materials including balloon film materials, for known periods of time, to the conditions present at known high altitudes, by deploying them from a package, and returning them to the package for ground return.

A further object of the invention is the provision of a deferred locking means which allows deployment of assay frames, and locks the package only after the assay tests have been made.

The invention comprises the means as well as the process for elevating to known high altitudes a plurality of samples of the materials to be tested, contained as an assay unit in a package of stowed and compacted frames. The elevating means may be balloon, helicopter, jet or other suitable and desired means. When the desired altitude is reached, the frames are deployed to a decompacted position below the package to be individually exposed to the prevailing conditions. At the termination of the predetermined time interval, they are replaced in the package and returned to the ground, by planned return of the balloon, by parachute, by air retrieval or any other suitable and desired means, for laboratory analysis.

In the device of the invention, frames, each holding a specimen of material to be tested, hinged on opposite alternatinging edges to an adjacent frame, are stacked on a lower movable floor of the device, the uppermost frame being hinged to the top of a frame compartment located in the package. At a signal, originating by time and/or altitude control, ground radio, or other desired means, the floor of the package is lowered and the frames are deployed in a substantially vertical line below the package. Upon the completion of a determined time interval the floor of the package is raised and the frames restored to compacted position within the package. A specially constructed latch, operable only upon first lowering and then raising the floor, secures the floor to the package.

The objects of the invention are as above stated, and further, providing the means for their execution.

These and other advantages, features and objects of the invention will become more apparent from the following description taken in connection with the illustrative embodiments in the accompanying drawings, wherein.

Figure 1:
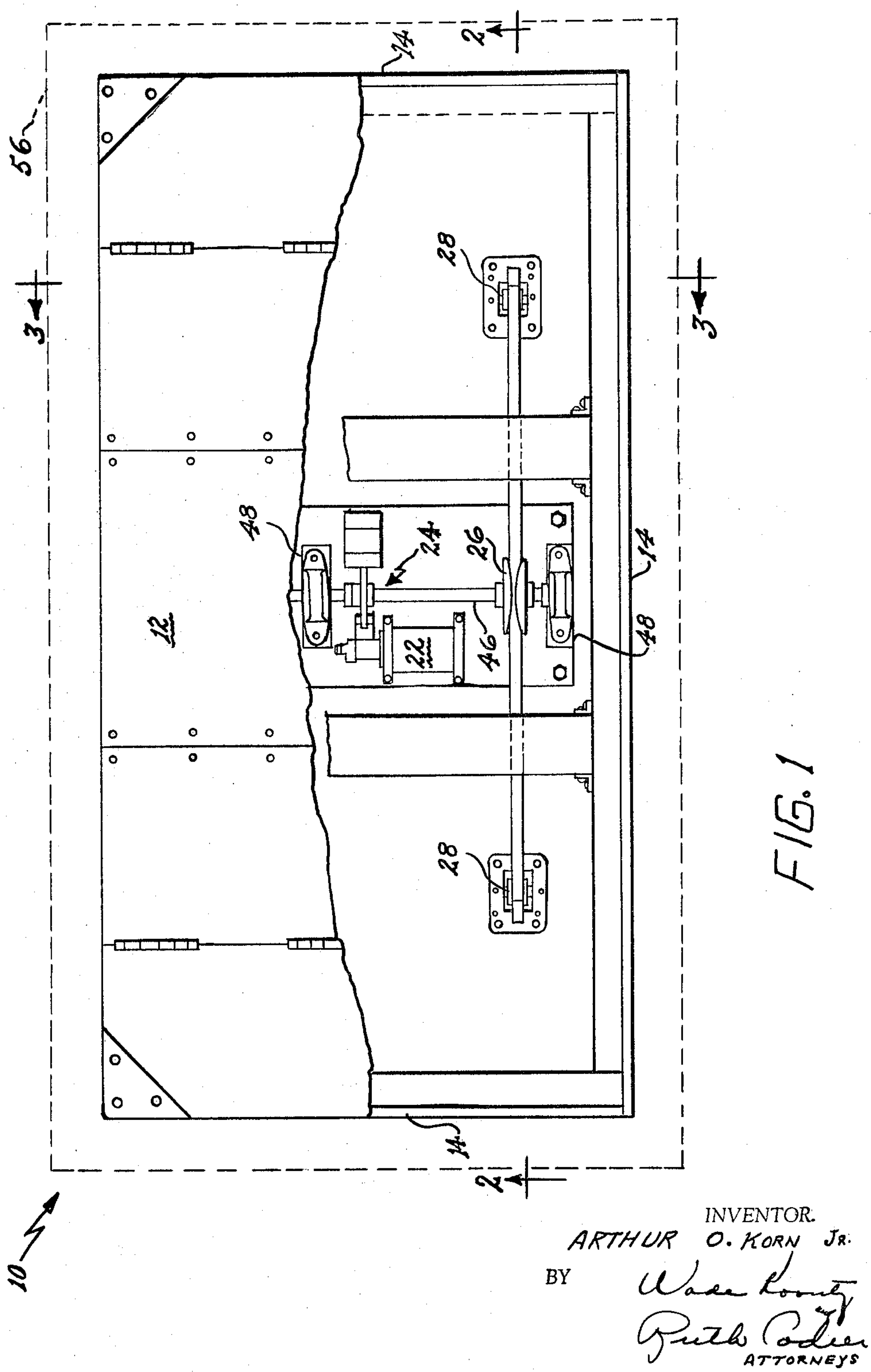
FIGURE 1 is a top plan view of the device.
Figure 2:
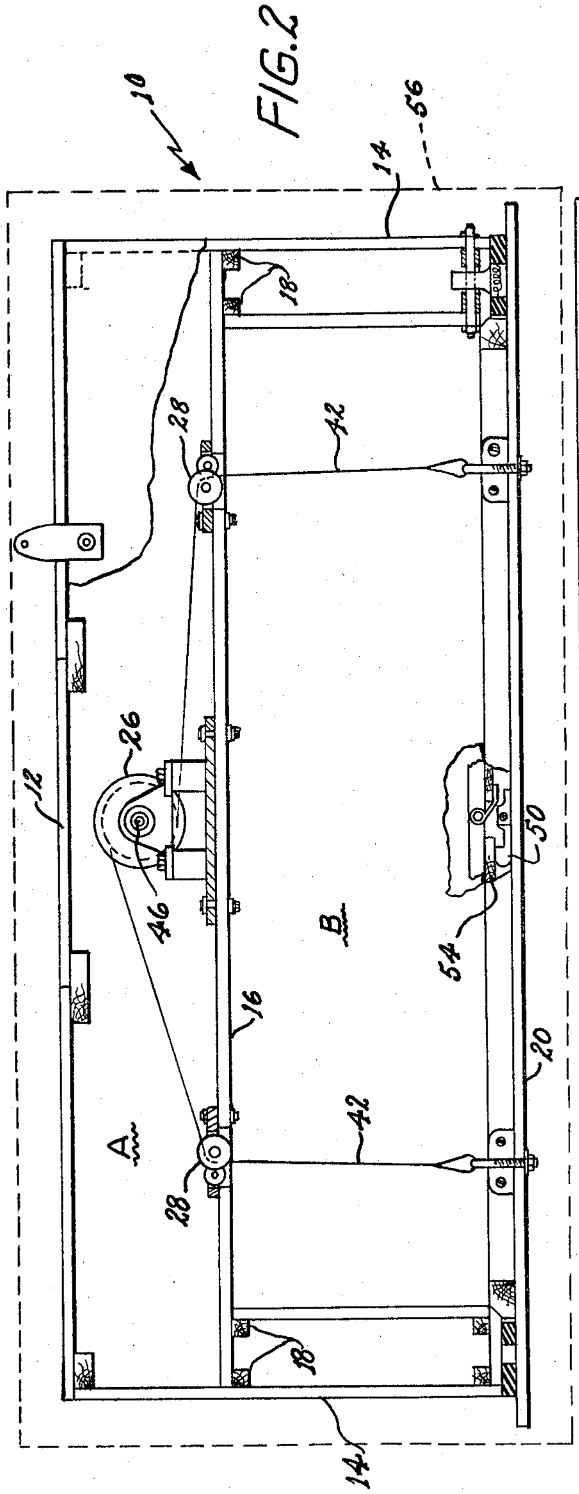
FIGURE 2 is a longitudinal sectional view of the device taken on the line 2—2 of FIGURE 1 with the assay frames removed, and showing the package locking device.
Figure 3:
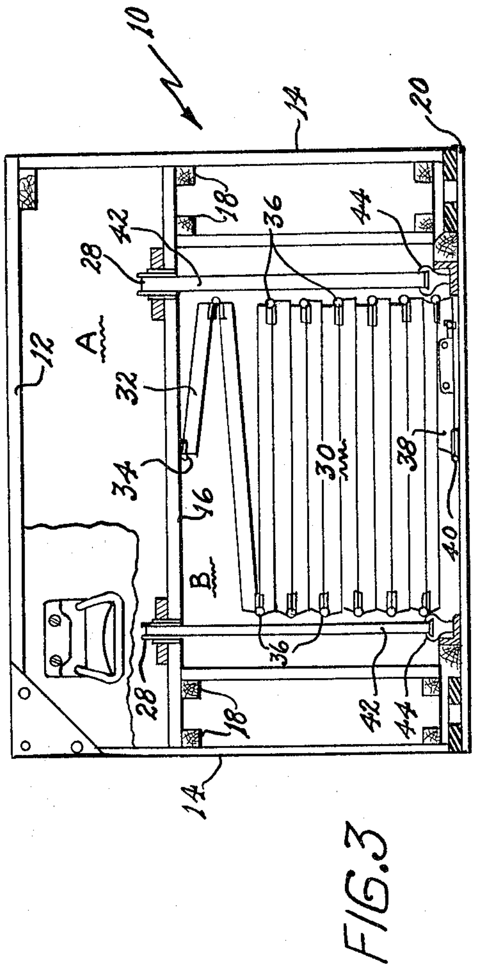
FIGURE 3 is a transverse sectional view of the device taken substantially along the line 3—3 of FIGURE 1.

Referring more in detail to the drawing, the whole package, capable of being borne aloft, by balloon or other means, is designated by the numeral 10. The package 10 comprises a top wall 12, side walls 14, an intermediate floor 16 immovably attached by any suitable means such as the beams 18 to the side walls 14, and a movable floor 20. The floor 16 divides the package into two compartments shown at A and B. The upper compartment A houses a motor 22 (FIGURE 1), a gear train 24, winding spools 26, pulleys 28 and control devices as required by individual designs of operation. The compartment B houses the stacked assay frame unit, indicated generally by the numeral 30, each frame being capable of carrying one or more specimens of material to be tested. The frames are hinged together in the manner shown in FIGURES 3 and 4. As shown, the inner end of the short top frame 32 is hinged at 34 to the member 16, which serves as floor for the upper compartment A, as a ceiling for the lower compartment B, and as support for the deployed frames. Each downwardly succeeding frame is hinged by hinges designated generally by the numeral 36 at one end to the frame above it, and at the other end to the frame below it in accordion style, the lowermost shortened frame 38 being hinged at 40 to the lower floor or cover or door 20 of the package 10. The lower floor 20 is suspended by pairs of pulley ropes or straps 42. The outer end of each strap 42 is attached to the floor 20 by any suitable means such as the rings 44 rising from and secured to the floor 20. The straps 42 pass over pulley wheels 28 and are attached at their inner ends by means (not shown) to a spool 26 in such a way that both straps are wound or unwound in unison, to raise the floor 20 or to lower it. The winding spools are mounted on the shaft 46, which is controlled to rotate in either direction by the motor 22 operating the gear train 24. As noted, the operation of the motor may be time altitude. ground radio or other desired means.

Figure 4:
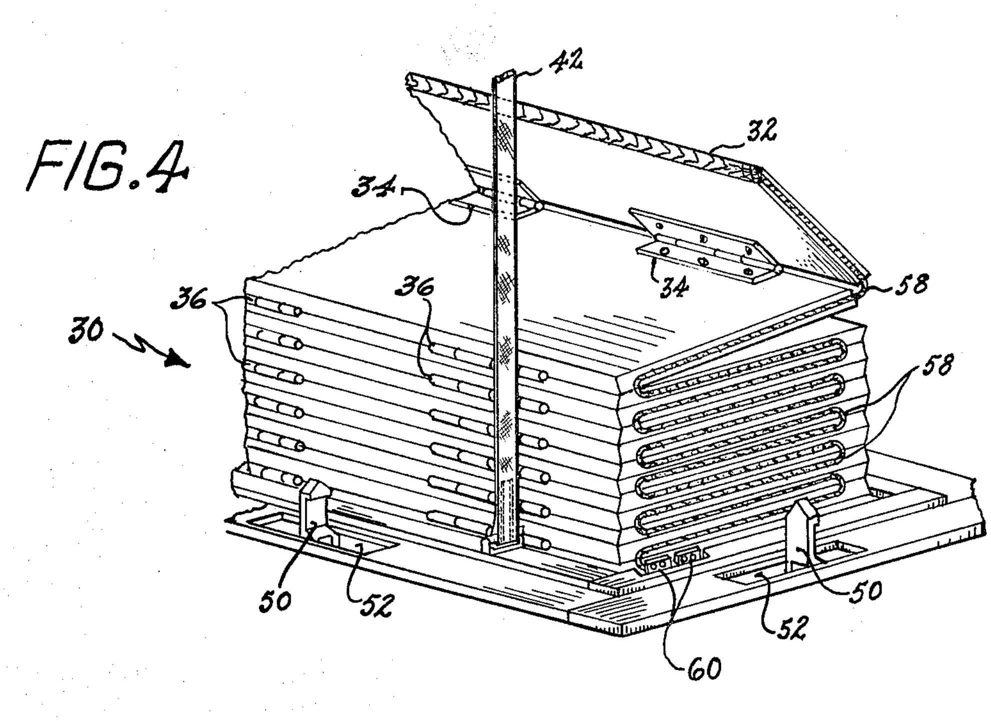
FIGURE 4 is a perspective view of a portion of the lower section of the package showing the assay unit of stowed frames resting on the lower floor of the package, the side walls being removed for interior viewing.
Figure 5:
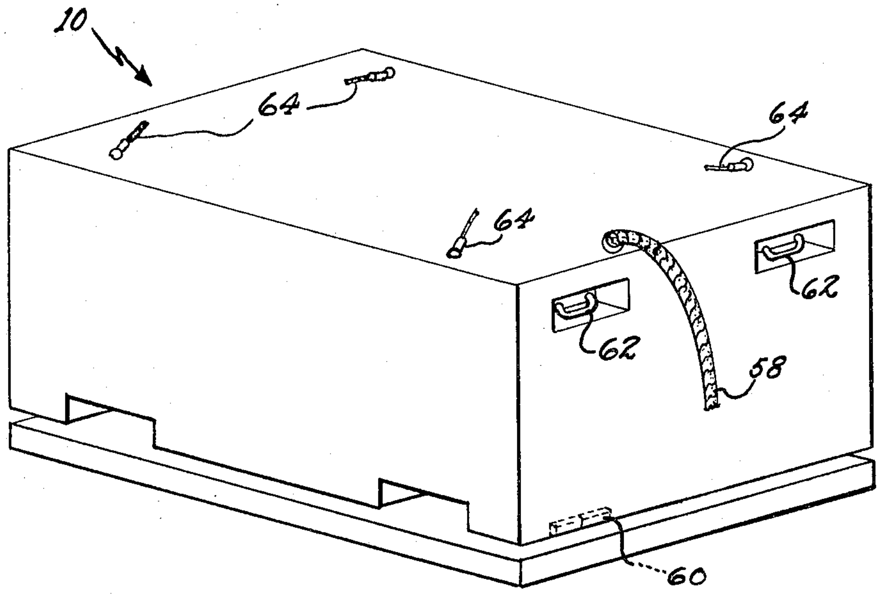
FIGURE 5 is a perspective view of the closed package, ready to become airborne.

Four latches 50, one on each side of the assay unit, are spring biased to stand upright as shown in FIGURE 4. When the unit is assembled, and prepared for carrying aloft, the latches 50 are held in the troughs 52 in a horizontal position, by latch plates 54. When the floor 20 is lowered for making the assay tests, the latches 50, separated from the restraining plate 54, are spring biased to stand erect. When the floor is again raised, the latches 52 engages the plates 54 to provide a secure lock for the ground return of the package.

A styrofoam or other protective padding is indicated at 56. The package is equipped with an electrical lead in system 58 and control devices such as micro switches 60 as required by the individual design.

Handles 62 and risers 64 are provided as expedient for handling and securing to balloon risers (not shown).

Although the invention has been described with reference to a particular embodiment, it will be understood to those skilled in the art that the invention is capable of a variety of alternative embodiments within the spirit and scope of the appended claims.

I claim:

1. An assay test unit for deploying test specimens at high altitudes and repositioning them in stowed condition, said test unit comprising a package having top and side walls, an intermediate immovable floor element dividing said package into upper and lower compartments, a movable lower floor in said lower compartment, pulley and winding wheel means for supporting said floor, motor means for operating said winding wheels in either direction for raising or lowering said floor, test frames adapted to carry specimens of material to be tested and adapted also to be stowed in said lower compartment the uppermost of said frames being hinged to the lower surface of said intermediate floor element, the lowermost of said frames being hinged to said movable floor, each of the intermediate ones of said frames being hinged on alternate opposite edges to its adjacent frame, so that, when said lower floor is lowered away from said package, said frames deploy from said package, depending therefrom in substantial vertical formation, locking means for locking said floor to said package, said locking means being operable only upon the raising of said floor after a previous lowering has taken place.

2. An assay package for testing of materials at known high altitudes, said package comprising a lower floor movable with respect to said package and capable of supporting a series of assay frames, a series of assay frames hinged together in accordion fashion means for lowering said floor away from said package to expose said assay frames to conditions prevailing outside of said package and means for returning said floor to position in contact with said package.

3. An assay package for testing of materials at known high altitudes, said package comprising a lower floor movable with respect to said package and capable of supporting assay materials, means for lowering said floor away from said package to expose said assay materials to conditions prevailing outside of said package, means for returning said floor to position in contact with said package, an assay unit comprising frames, each frame being capable of carrying specimens of material to be tested, said frames being connected to said package and to each other to deploy in a substantially vertical line below said package, and capable of being returned to stowed condition in said package.

4. An assay package for testing of materials at known high altitudes, said package comprising a lower floor movable with respect to said package and capable of supporting assay materials, means for lowering said floor away from said package to expose said assay materials to conditions prevailing outside of said package, means for returning said floor to position in contact with said package, an assay unit comprising frames, each frame being capable of carrying specimens of material to be tested, said frames being connected to said package and to each other to deploy in a substantially vertical line below said package, and capable of being returned to stowed condition in said package, and deferred locking means for locking said floor to said package, only after said floor has first been lowered and returned to a position of contact with said package.

5. An assay package for testing of materials at known high altitudes, said package comprising a lower floor movable with respect to said package and capable of supporting assay frames, a series of assay frames hinged together in accordion like fashion means for lowering said floor away from said package to expose said assay frames to conditions prevailing outside of said package, means for returning said floor to position in contact with said package, deferred locking means for locking said floor to said package only after said floor has first been lowered.

6. An assay package for testing of materials at known high altitudes, said package comprising a lower floor movable with respect to said package, an assay unit for carrying specimens of material to be tested, said unit resting on said lower floor and movable with it, said assay unit comprising specimens, carrying frames, each of said frames being hinged to an adjacent frame to deploy in substantially a straight line outside of said package, means for moving said floor to deploy said frames to a position outside of said package for determining the effects of conditions existing outside of said package upon said specimens, and means for moving said floor to return said frames to stowed condition inside said package.

References Cited by the Examiner

UNITED STATES PATENTS

| | | | |
|---|---|---|---|
| 2,985,008 | 5/1961 | Renard | 73—45.2 |
| 3,104,542 | 9/1964 | Scoggins | 73—170 X |

DAVID SCHONBERG, *Primary Examiner.*